United States Patent
Patino et al.

(10) Patent No.: US 6,326,770 B1
(45) Date of Patent: Dec. 4, 2001

(54) BATTERY CHARGING SYSTEM APPARATUS AND TECHNIQUE

(75) Inventors: Joseph Patino, Pembroke Pines; Mark W. Johnson, Lauderhill, both of FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/655,141

(22) Filed: Sep. 5, 2000

(51) Int. Cl.$^7$ ....................................................... H02J 7/00
(52) U.S. Cl. ............................................. 320/132; 320/130
(58) Field of Search .................................... 320/132, 130, 320/124, 125, 134, 136

(56) References Cited

U.S. PATENT DOCUMENTS 5,969,508 * 10/1999 Patino et al. .......................... 320/153
5,994,878 * 11/1999 Ostergaard et al. .................. 320/132
6,023,150   2/2000 Patino et al. ........................... 320/132

* cited by examiner

Primary Examiner—Peter S. Wong
Assistant Examiner—Lawrence Luk
(74) Attorney, Agent, or Firm—Barbara A. Doutre; Scott M. Garrett

(57) ABSTRACT

A battery charging method (300) determines a current at which to start charging the battery which provides the capability for faster higher current sourcing capability. A start current ($I_{start}$) is determined based on the battery's cut off voltage, steady state voltage, and characteristic impedance (314). This start current is then compared and adjusted based on the rated power supply current for the power supply (316, 318) and rated charge current for the battery (320, 322). The adjusted current is then applied to the battery (324) at the beginning of the charge sequence to provide faster higher current sourcing capability.

4 Claims, 4 Drawing Sheets

BATTERY CHARGING SYSTEM APPARATUS AND TECHNIQUE

TECHNICAL FIELD

This invention relates to in general to battery charging systems and more particularly to battery charging techniques for portable radio products.

BACKGROUND

Presently, charging schemes for charging Lithium Ion and Lithium polymer batteries in portable radios and cellular phones incorporate a ramped charge current approach. This ramped current approach is required because Lithium batteries typically contain a safety circuit that has an associated voltage cutoff value ($V_{cutoff}$) associated to it. This cutoff value is set such that any current going into the battery cannot cause the cell to exceed this voltage value. If the voltage value is exceeded, the protection circuitry will open circuit the battery preventing further current from reaching the cell. This approach protects the cell from being overcharged and prevents catastrophic failure such as venting with flame. The ramped current approach is used to prevent a fully charged battery from overshooting the voltage cutoff ($V_{cutOff}$) point with a current spike and accidentally causing an open circuit of the battery's overvoltage circuitry, thereby possibly damaging the battery and/or causing the radio to turn off.

The basic problem with the ramped current approach occurs when a user has a completely discharged battery (also referred to as a dead battery) and wants to transmit quickly. The ramping current is rather slow and causes an unwanted wait period to occur before the radio is capable of withstanding the transmit current. To illustrate the problem, the following example is described. Using a typical transmit current of 600 mA for a 3.6 Volt radio system, the ramp current will need to ramp up to a 600 mA level before enough charge current can be provided to the radio to maintain the transmit call. Further using a typical 4 mA per second charge ramp rate, the prior art ramp technique takes approximately 150 seconds (2 and ½ minutes) for the charge current to reach the point where the radio will be able to maintain the transmit load. Referring to FIG. 1, the prior art charge scheme wait period is depicted in graph 100. This wait period 102 can be very annoying to an end user who wants to quickly make a phone call after attaching a charger or power supply to his/her phone to charge a dead battery.

Accordingly, there is a need for an improved charging apparatus and technique for charging systems which minimize the unwanted wait period before transmit is allowed.

DETAILED DESCRIPTION OF THE PREFERRED EMBODIMENT

Figure 1:
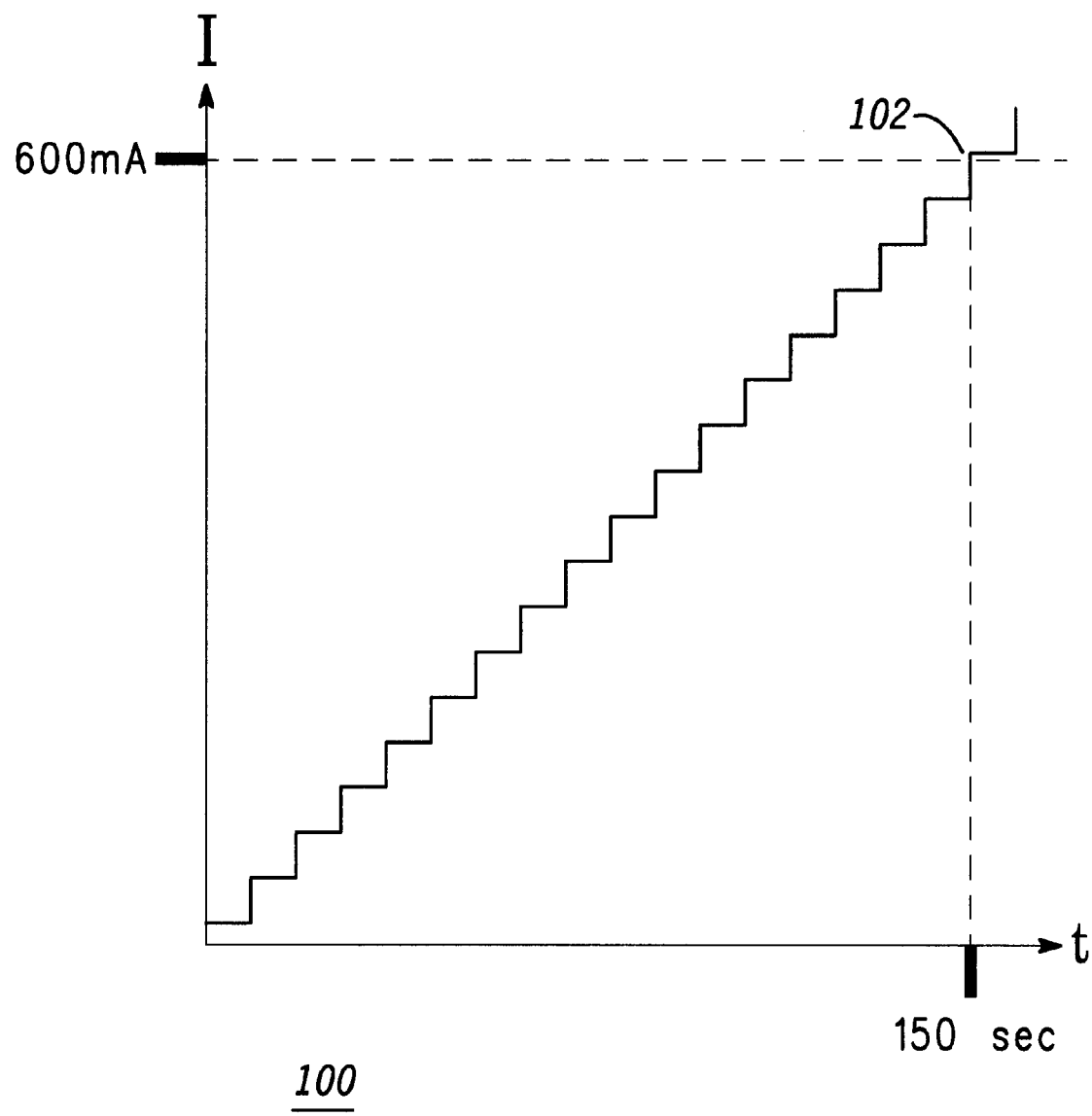
FIG. 1 is a graph of an example of a wait period for the prior art ramp current approach.

While the specification concludes with claims defining the features of the invention that are regarded as novel, it is believed that the invention will be better understood from a consideration of the following description in conjunction with the drawing figures, in which like reference numerals are carried forward.

Figure 2:
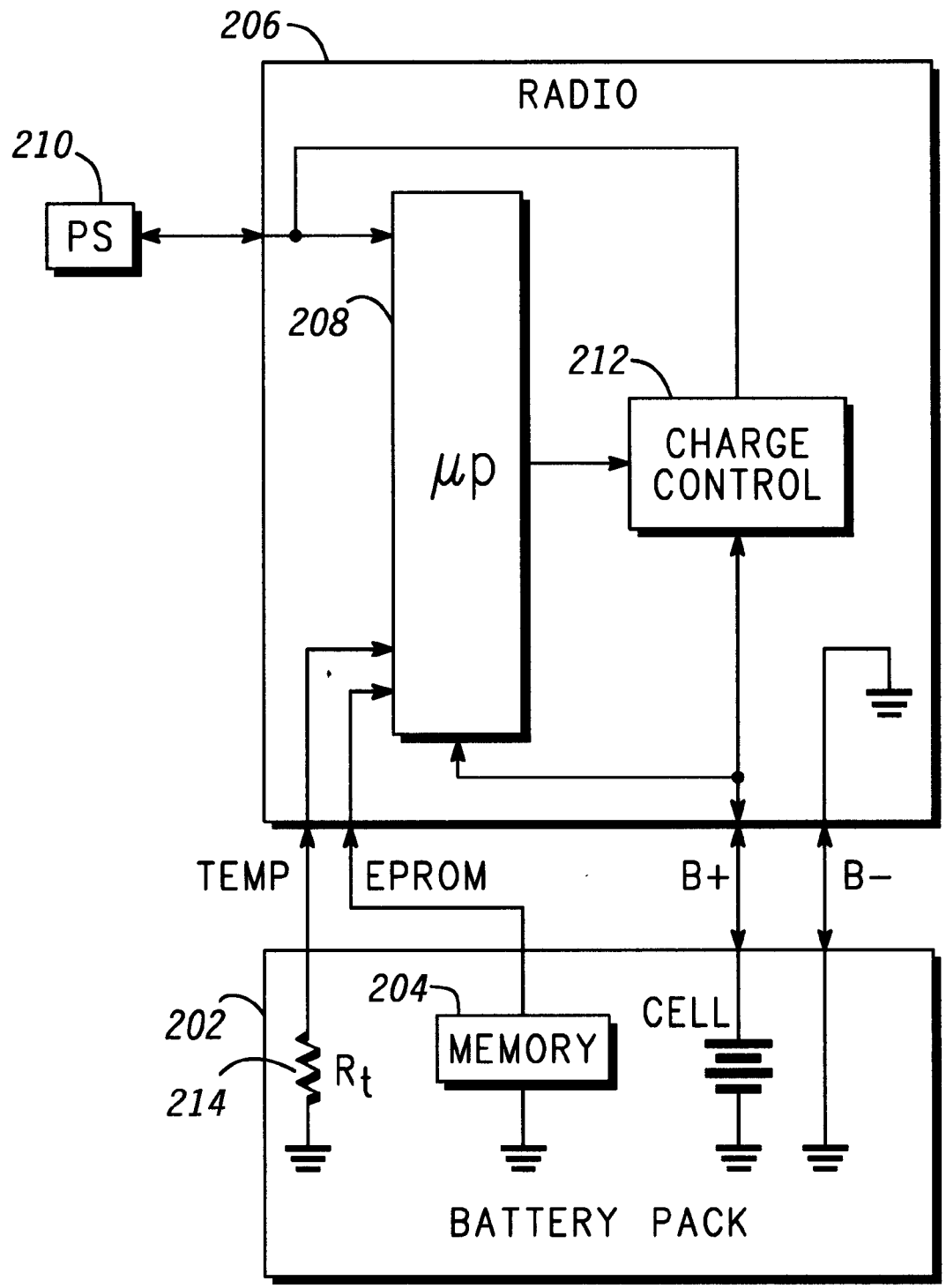
FIG. 2 is a graph of a wait period for a charge system in accordance with the present invention.

Referring to FIG. 2, there is shown a battery charging system in accordance with the present invention. System 200 includes a battery pack 202 having a memory portion 204, such as an EPROM, for storing boundary information including voltage cutoff ($V_{cutoff}$) and rated charge current ($I_c$), and a characteristic impedance (Z). A radio 206, coupled to the battery 202, includes a micro-controller 208 for reading the memory 204 of the battery pack 202 and measuring a steady state voltage (i.e., without charge current, $V_{I=0}$) of the battery. System 200 further includes a power supply 210 for charging the battery 202, the power supply having a maximum rated power supply current ($I_{maxps}$). This maximum rated power supply current ($I_{maxps}$) is preferably stored in a look-up table containing information about power supply types and their associated current values found in either the radio 206 or the battery 202. A thermistor (Rt) 214 is preferably included in the battery 202 so that micro-controller 208 can monitor the battery temperature.

In accordance with the present invention, the micro-controller 208 calculates a start current for charging the battery 202 by subtracting the steady state voltage from the cutoff voltage and then dividing by the characteristic impedance: $I_{start}=[V_{Cutoff}-V_{I=0}]/(Z)$.

In accordance with the present invention, the micro controller 208 adjusts the start current depending on the maximum rated power supply current and the rated charge current, and then power supply 210 applies this adjusted start current to the battery 202. Adjustments are preferably made via radio charge control circuitry 212. Thus, the radio 206 is now capable of sinking current from the adjusted start current of the battery 202 during the beginning of a charge sequence. In accordance with the present invention, the power supply 210 charges the battery pack with a start current ($I_{start}$) that is the maximum charge current that can be put into the battery pack without overshooting the battery pack's maximum rated cutoff voltage ($V_{CutOff}$). This current is at most either the maximum allowable rated charge current at which the battery pack may be charged ($I_c$), or the maximum power supply current ($I_{maxps}$). Thus, a higher level of current is available from the battery pack 202 at the beginning of the charge sequence thereby providing the capability for the radio 206 to sink a higher current level (the adjusted $I_{start}$ current), such as for transmitting a signal, sooner.

Figure 3:
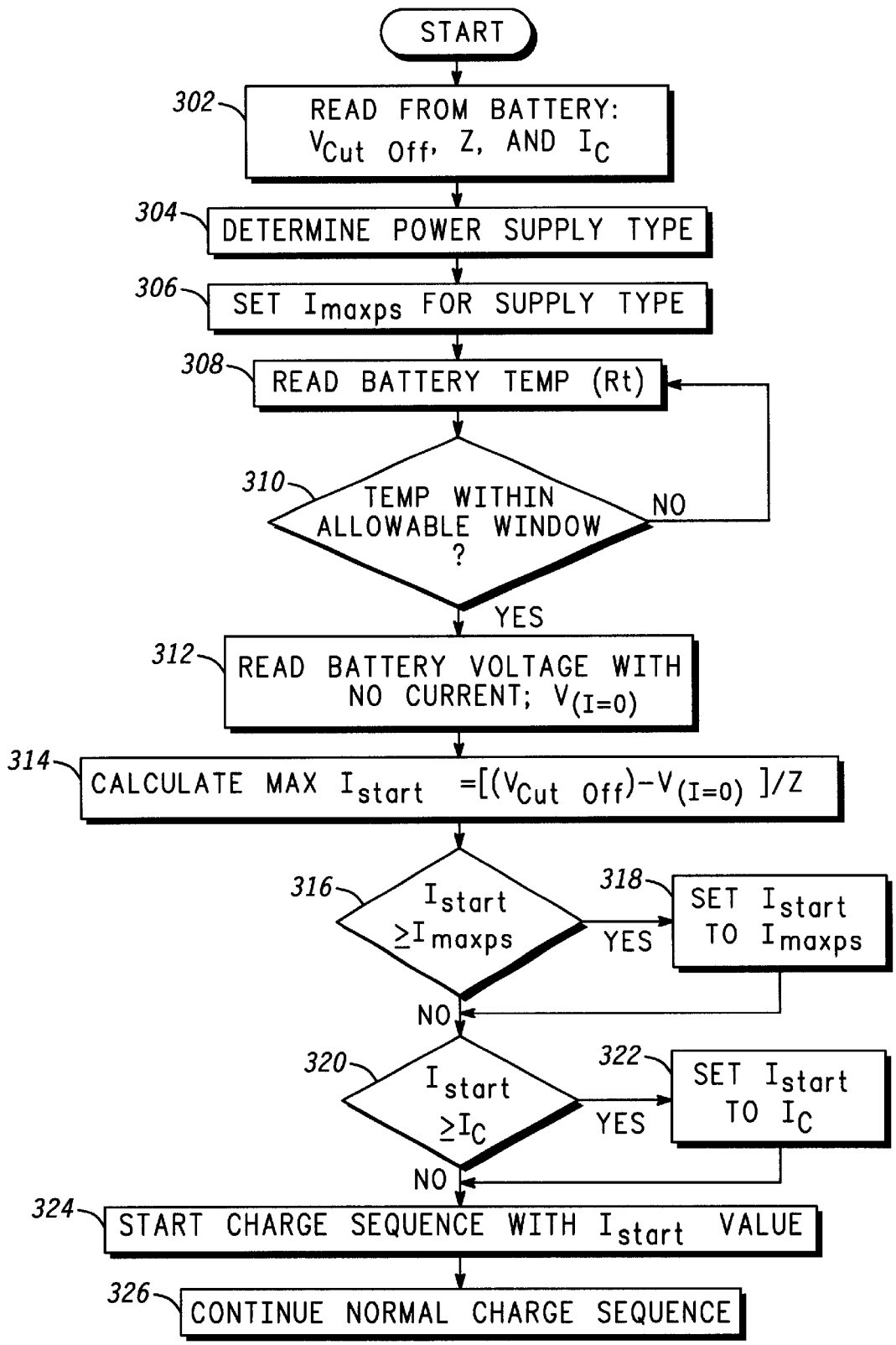
FIG. 3 is a flowchart of a charging method in accordance with the present invention.

In accordance with the present invention, the charging system 200 utilizes a charging method shown in FIG. 3 to charge the battery. At step 302, the battery's characteristic Voltage Cut Off ($V_{CutOff}$) impedance (Z), and charge current rate ($I_c$) values are read from the battery's memory, such as from an EPROM. $V_{cutoff}$ is the maximum rated voltage level to which the battery can be charged. Impedance (Z) is the characteristic internal battery pack impedance. Charge current rate ($I_c$) is the maximum allowable rated charge current at which the battery may be charged. At step 304, the power supply type connected is identified. At step 306, the maximum power supply current ($I_{mapxs}$) is set. This is accomplished by picking the associated current value for the power supply type identified in step 304 from a look-up table for all of the valid power supply types and their associated current values.

At step 308, the battery's temperature is preferably determined by reading the value of the thermistor contained in the battery. Step 310 then compares the read temperature value in step 308 to that of the allowable temperature window. If the battery temperature is not within the allowable charge window then the charge sequence reverts back to step 308 and continues to monitor the battery temperature until the battery is within the allowable charge temperature window. Once the battery temperature is within the allowable temperature charge window, then the charge sequence continues to step 312.

In step 312, the battery voltage is read with no charge current applied to the battery ($V_{I=0}$), also referred to as steady state voltage. In step 314, the start current ($I_{start}$) is calculated. The start current is determined by dividing the difference between the Voltage Cut Off value and the Voltage of the battery with no current flowing into it (as read in step 312) divided by the battery impedance as follows:

$$I_{start} = [V_{CutOff} - V_{I=0}]/(Z)$$

The $I_{start}$ current is thus the maximum start charge current that can be put into the battery without overshooting the maximum voltage ($V_{CutOff}$). Once the start current $I_{start}$ has been determined in step 314, its value is compared to the maximum power supply current value $I_{maxps}$ in step 316. If $I_{start}$ is greater than $I_{maxps}$, then $I_{start}$ is set to $I_{maxps}$ in step 318. Step 318 provides assurance that the current to be set does not exceed the current capability of the connected power supply. Step 318 then continues to step 320. However, if $I_{start}$ is less than $I_{maxps}$ then $I_{start}$ is left as is and step 316 continues to step 320. At step 320 the start current $I_{start}$ is compared to the charge current rate ($I_c$) If $I_{start}$ is greater than $I_c$, then $I_{start}$ is set to $I_c$ in step 322. Step 322 provides assurance that the current to be set does not exceed the current sinking capability of the battery connected. Step 322 then continues to step 324. However, if $I_{start}$ is less than $I_c$, then $I_{start}$ is left as is and step 320 continues to step 324.

The start current is now applied to the battery at step 324. Once the start current is started in step 324, the normal charge sequence is continued in step 326. In other words, the start charge current may be modified during the progression of the charge sequence in order to maintain the boundary conditions of Vcutoff, $I_c$, and Ipowersp.

Figure 4:
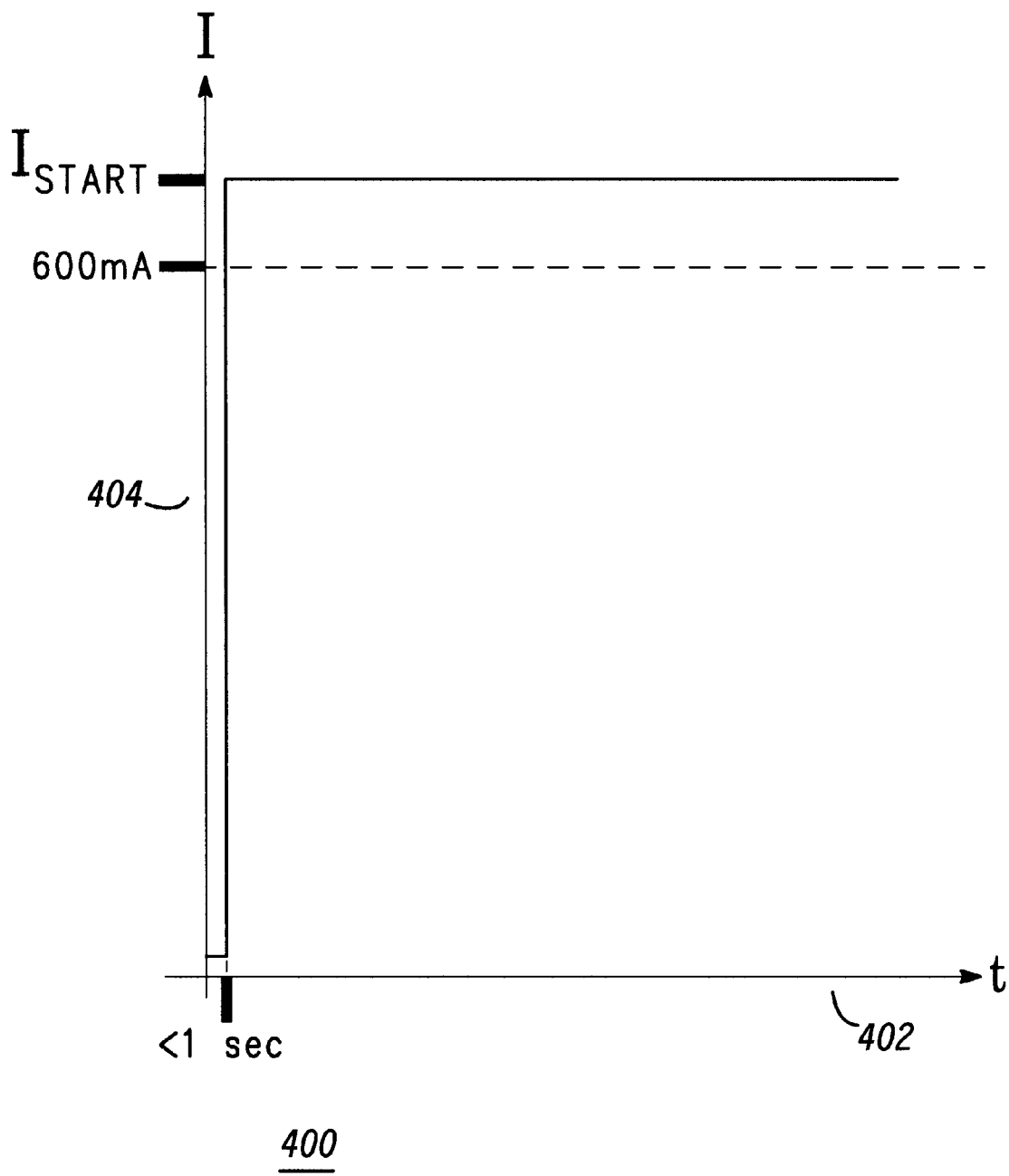
FIG. 4 shows a graph depicting a wait period for a charge system formed in accordance with the invention.

Referring now to FIG. 4, there is shown a graph 400 depicting a wait period (time 402 vs current 404) for a charge system formed in accordance with the present invention and using the same parameters and test set up as that used for FIG. 1. As can be seen by graph 400 the wait state of 2 and ½ minutes is now reduced to less than 1 second. The charge sequence of the present invention truncates the wait period required for transmitting a signal while assuring of that the cut off voltage value of the battery is not overshot. Therefore, $I_{start}$ is the maximum current that the battery can be charged at without exceeding the boundary condition $V_{CutOff}$ value for that battery and while maintaining the boundary conditions of $I_c$ and $I_{maxps}$. Though beneficial to a variety of charging systems, the charge technique of the present invention is particularly well suited for systems utilizing lithium ion and lithium polymer batteries because those systems require a safety circuit that has an associated voltage cutoff value ($V_{CutOff}$)

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A battery charging system, comprising:

a radio;

a battery pack coupled to the radio;

a power supply for charging the battery pack, the power supply starting a charge sequence on the battery pack with a start current that is the maximum charge current that can be put into the battery pack without overshooting the battery pack's maximum rated cutoff voltage ($V_{CutOff}$), which is at most;

the maximum allowable rated charge current at which the battery pack may be charged ($I_c$); or the maximum charge current that the power supply can supply ($V_{maxps}$).

2. The battery charging system of claim 1, wherein the radio sinks current from the battery with the start current.

3. A charging system, comprising:

a battery having a memory portion for storing boundary information including voltage cutoff and rated charge current, and a characteristic impedance;

a radio having a micro controller for reading the memory of the battery and measuring a steady state voltage of the battery;

a power supply for charging the battery, the power supply having a maximum rated power supply current;

the micro controller calculating a start current for charging the battery by subtracting the steady state voltage from the cutoff voltage and then dividing by the characteristic impedance;

the micro controller adjusting the start current depending on the maximum rated power supply current and the rated charge current; and the power supply applying the adjusted start current to the battery.

4. The battery charging system of claim 3, wherein the radio sinks current from the adjusted start current of the battery during the beginning of a charge sequence.

* * * * *